3,043,861
Patented July 10, 1962

United States Patent Office

3,043,861
BICARBAMIC ACID DIESTER WITH SERINE
William Shive, 843 E. 38th St., and Charles Gordon Skinner, Jr., 1817 E. 40th St., both of Austin, Tex.
No Drawing. Filed Dec. 15, 1959, Ser. No. 859,582
1 Claim. (Cl. 260—482)

This invention relates to O,O'-bicarbamylserine of the formula

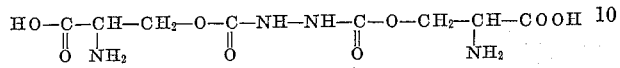

The official name for this compound under the Chemical Abstracts System is bicarbamic acid diester with serine, but for the sake of convenience, the compound will be hereinafter referred to as O,O'-bicarbamyl serine.

This novel compound is prepared by reacting N-carbobenzoxy-DL-serine benzyl ester in a suitable organic solvent medium, such as toluene, with phosgene. The reaction is preferably carried out at a reduced temperature, such as 0–5° C. and over an extended period of time, such as about 15 to 20 hours. From the reaction mixture, the solvent is removed, conveniently under reduced pressure and with warming. The product then is preferably freed of residual phosgene and HCl gas by repeated addition and evaporation of benzene or other suitable solvent.

The resultant material is reacted, in a suitable solvent, such as ethanol, with hydrazine, preferably in the presence of aqueous sodium carbonate. The resultant product is hydrogenolyzed, using a suitable catalyst, if desired, and the O,O'-bicarbamylserine product recovered by any convenient procedure.

The compound of this invention is useful as an antibacterial, inhibiting the growth, for example, of *Lactobacillus arabinosus* and *Streptococcus lactis*. It is well known in the bacteriological art that the latter organism is primarily responsible for souring raw milk. See "Principles of Microbiology," Carter and Smith (1954), page 549, and "Microbiology, General and Applied," Sarles and Frazier (1947), page 199. A 0.2% solution of this compound in water is useful as a rinse for dairy equipment.

The invention will be described in greater detail by the following specific example:

Example

A mixture of 6.6 g. of N-carbobenzoxy-DL-serine benzyl ester partially dissolved in 75 ml. of toluene was saturated with phosgene at 0–5° C. The reaction mixture was kept for 16 hours at room temperature in a rubber-stoppered flask to effect complete reaction. The solvent was removed under reduced pressure, with warming, to yield a pale yellow oil which was freed of residual phosgene and hydrogen chloride gas by repeated addition and evaporation with benzene. A solution of this oil was condensed with 1.0 g. of 95% hydrazine in 25 ml. of ethanol in the presence of 1.1 g. of sodium carbonate in 15 ml. of water to give 7.1 g. of a clear colorless oil. This oil, in 100 ml. of ethanol, was treated with hydrogen gas for 8 hours at atmospheric pressure and room temperature in the presence of 0.7 g. of palladium black. The catalyst was filtered, washed with warm water, and the combined filtrates were taken to dryness under reduced pressure with warming, to yield 1.9 g. of solid residue. This solid material was suspended in 25 ml. of boiling methanol, and water was added with heating until solution was complete. After standing in the refrigerator for several hours, a gelatinous solid precipitated out, which was collected, washed with cold methanol followed by ether, and dried over phosphorus pentoxide in vacuo to give 0.7 g. of O,O-bicarbamylserine, M.P. 192–195° C. dec.

*Analysis.*—Calcd. for $C_8H_{14}N_4O_8 \cdot \frac{1}{2}H_2O$: C, 31.68; H, 4.98; N, 18.48. Found: C, 31.95; H, 4.95; N, 18.68.

This application is a continuation-in-part of application Number 778,284, filed December 5, 1958, and now abandoned.

The invention claimed is:
Bicarbamic acid diester with serine.

References Cited in the file of this patent

Skinner et al.: J. Am. Chem. Soc., vol. 78, pages 2412–2414 (1956).

McCord et al.: J. Am. Chem. Soc., vol. 80, No. 14, pp. 3762–3764, July 20, 1958.